(12) United States Patent
Hausmann et al.

(10) Patent No.: US 6,797,222 B2
(45) Date of Patent: Sep. 28, 2004

(54) SLUSH MOLDING PROCESS

(75) Inventors: Karlheinz Hausmann, Auvernier (CH); George K. Kodokian, Kennett Square, PA (US); George W. Prejean, Orange, TX (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 78 days.

(21) Appl. No.: 10/284,924

(22) Filed: Oct. 31, 2002

(65) Prior Publication Data

US 2003/0119981 A1 Jun. 26, 2003

Related U.S. Application Data

(63) Continuation-in-part of application No. 09/544,679, filed on Apr. 7, 2000, now abandoned.
(60) Provisional application No. 60/129,409, filed on Apr. 15, 1999.

(51) Int. Cl.[7] ............................................. B29C 41/18
(52) U.S. Cl. ..................... 264/302; 264/296; 264/300; 264/301; 525/194; 525/206; 525/209; 525/212; 525/221; 525/479; 525/536; 525/539; 525/934
(58) Field of Search .................................. 264/296, 300, 264/301, 302; 525/207, 208, 327.3

(56) References Cited

U.S. PATENT DOCUMENTS

| | | |
|---|---|---|
| 2,736,925 A | 3/1956 | Heisler et al. |
| 3,039,148 A | 6/1962 | Engel |
| 4,855,363 A | 8/1989 | Moteki |
| 5,036,124 A | 7/1991 | Igarashi et al. |
| 5,308,699 A | 5/1994 | Hikasa et al. |
| 5,744,086 A | 4/1998 | Hallam |
| 5,928,577 A | 7/1999 | Kodokian |
| 6,395,839 B2 * | 5/2002 | Valligny et al. ............ 525/310 |

FOREIGN PATENT DOCUMENTS

| | | |
|---|---|---|
| EP | 0 341 731 A2 | 11/1989 |
| EP | 0 339 222 B1 | 9/1993 |
| EP | 0 476 742 B2 | 9/2000 |
| JP | 11028732 A | 2/1999 |
| WO | WO 93/08234 | 4/1993 |
| WO | WO 97/35910 | 10/1997 |
| WO | WO 02/07946 A1 | 1/2002 |

OTHER PUBLICATIONS

PCT International Search Report for International application No. PCT/US00/09881 dated Jul. 18, 2000.
Khue, N. N., et al., Development of Optimum Powder Blends for Slush Moulding, EVC Fed. Rep of Germany, 13/1–13/14.

* cited by examiner

*Primary Examiner*—Fred Teskin

(57) ABSTRACT

A slush molding process in which the moldable thermoplastic composition powder dosed to the mold is prepared by blending ethylene carboxylic acid copolymers or ionomers with ethylene/glycidyl acrylate or methacrylate copolymer and cross-linking promoter at a temperature and for a time that does not cause significant cross-linking prior to dosing to mold, which is held for sufficient time and temperature to cause cross-linking in-situ, and optionally, other additives including release agents.

10 Claims, No Drawings

SLUSH MOLDING PROCESS

CROSS-REFERENCE TO RELATED APPLICATIONS

This application claims the benefit of U.S. Provisional Application No. 60/129,409, filed Apr. 15, 1999, herein incorporated by reference for all purposes.

This application is a Continuation-in-Part of U.S. application Ser. No. 09/544,679, filed Apr. 7, 2000, now abandoned, which is incorporated herein in its entirety.

BACKGROUND OF THE INVENTION

1. Field of the Invention

This invention relates to a method for powder slush molding a thermoplastic composition which exhibits excellent low temperature properties coupled with heat and scuff resistance and is useful for auto and boat interior applications.

2. Background of the Invention

As generally known, slush-molding technology is broadly used for the manufacture films or sheets of material such as imitation leathers for the upholstery of cars, boats, and other car and boat interior applications, and in particular for the covering of dashboards and door panels. Said technology allows for obtaining even highly three-dimensional imitation leathers easily and with low costs; moreover, slush molding gives the molded sheet a leather design of excellent quality, and also allows carrying out even two-color leathers.

The slush-molding method is well known and reported in scientific literature, for instance in the following recent articles:

Pabst H. G., Shaper S., Schmidt H., Terveen A. (AUDI VW Group)-VDI Conference-Mannheim 1988—"Development and large-scale use of dashboards produced by Slush Molding PVC"

Khue N. N., Kunper-Martz M., Dankmeier O., (EVC Group)—"Development of optimum powder blend for slush molding"

4 International Conference on PVC 1990 April 24th–26th 1990, Brighton U. K. pp. 31/131/14.

The following patents also contain descriptions related to slush molding: U.S. Pat. No. 2,736,925; U.S. Pat. No. 3,039,146, EP-A-0 339 222, EP-A-0 476 742 and WO 0207946.

Slush molding technology is based on a method that typically includes the following stages:

a) an open-air tank is first filled with a suitable polymer powder in a sufficient quantity and with grain sizes typically below 500 micrometers;

b) a mold, usually electroplated with nickel, is then heated to a given temperature;

c) the tank and the mold are then coupled in a closed system with suitable coupling means;

d) the system is moved so that the tank transfers the powder onto the mold, thus obtaining a uniform layer of partially or completely melted powder which adheres to said mold;

e) the closed system is then opened after being brought to the initial conditions again; at this stage the possible excess polymer powder deposits again into the tank and can thus be regenerated;

f) the mold can now be heated in order to complete the melting;

g) the mold is then cooled with suitable cooling means;

h) the formed leather is stripped off as a semi-finished product which can then be assembled with a support in order to obtain the finished product in the form of dashboard, door panels, and so on, for the upholstery of cars.

Polyvinyl Chloride (PVC) has a solid place for use as a sheet material in automotive interior applications but is under attack due to the fact that it contains halogens and plasticizers. One of the applications of PVC in auto interiors is as slush molded material for door panels and dashboards. For the slush molding process, powders arm used. The plasticizers contained in these formulations facilitate the flow and the fusing of the powder in the slush molding process where the powder is brought in contact with a hot mold from where it has to be released thereafter. The presence of a high amount of plasticizers has however the negative effect of exaggerated fogging of the interior surfaces of windows, particularly the front window, during hot summer days. This effect as well as the high chlorine content of PVC has triggered the search for polymeric plasticizers or highly temperature stable plasticizers as described in U.S. Pat. No. 5,036,124, and the search for halogen-free slush molding systems. The most frequently used halogen-free systems are systems based on TPU (Thermoplastic Polyurethane). However, due to their high cost, they are not an economical solution for the majority of cars. Alternatives have been promoted based on elastomer powders or polypropylene (PP). U.S. Pat. No 5,308,699 claims a slush moldable Ethylene Propylene (EP) rubber with a cross-linked EP phase, U.S. Pat. No. 5,744,086 claims a PP based system. The drawback of these systems is the insufficient chemical resistance of these systems against chemical agents such as fluids which eventually require a costly surface protection, such as a lacquer on top of the slush molded sheet.

WO 0207946 addresses problems presented in typical slush-molding art by combining a slush-molding method with cross-linking. The process is characterized in that, before or after the stripping-off stage (stage h, noted above), the semi-finished product as a film is cross-linked by means of radiation in order to obtain a covering leather.

The present invention provides a method of slush molding that combines slush molding and in-situ cross linking without the use of radiation and overcomes the drawbacks of the prior art. The drawbacks are overcome by providing, as the powder dosed to the mold in a slush molding process, a composition comprising a powder comprising polar and thus solvent (fuel) resistant polymers which crosslinks in situ without radiation during the slush molding process.

SUMMARY OF THE INVENTION

The present invention provides a slush molding process during which the slush moldable polyolefin composition of this invention crosslinks in-situ during the slush molding process to provide a slush-molded composition that has superior chemical and temperature resistance.

The slush-molded composition is useful in automotive and non-automotive applications including essentially all applications where flexible vinyl sheet or articles molded therefrom have been or can be used.

The process of the present invention is a slush-molding process characterized by employing, as the powder to be slush molded, the composition of the present invention made under conditions of time and temperature to ensure the composition does not significantly react/crosslink prematurely, preferably 60–150° C., more preferably 90–120° C. The powder, preferably with sufficient promoter and more preferably further with sufficient release agents, is dosed into a hot mold held at a sufficiently high temperature for a sufficient time to cause cross-linking, preferably between 180–270° C., more preferably between 200–250° C. The powder melts, levels out, and cross-links in-situ to form a homogeneous skin, which can be removed from the mold following a heating cycle of about 2–6 min and cooling.

The composition of the present invention comprises
(a) 5–95% by weight of a copolymer comprising at least 50% by weight of ethylene, 1–35% by weight of an (acid containing) unsaturated carboxylic acid, and 0–49% by weight of a moiety selected from at least one of alkyl acrylate, alkyl methacrylate, vinyl ether, alkylene, carbon monoxide and sulphur dioxide, and further wherein the acid groups are optionally partially neutralized with metal ions; and
(b) 95–5% by weight of a copolymer comprising at least 50% by weight of ethylene, 0.5–25% by weight of at least one reactive moiety selected from the group consisting of
  (i) an unsaturated epoxide of 4–11 carbon atoms,
  (ii) an unsaturated isocyanate of 2–11 carbon atoms,
  (iii) an alkoxy or alkyl silane wherein the alkyl group is from 1–12 carbon atoms,
  (iv) an alkyl halide, and
  (v) oxazoline, and
  0–49% by weight of a moiety selected from at least one of an alkyl acrylate, alkyl methacrylate, vinylether, alkylene, carbon monoxide and sulphur dioxide, where the alkyl and ether groups are of 1–12 carbon atoms; and preferably
(c) sufficient amount of cross-linking promoter such as tertiary amines or alkyl halides; and more preferably, in addition to the promoter,
(d) a sufficient amount of at least one release agent to reduce adhesion to metal molds.

The compositions may further comprise any additive which could be useful to enhance or modify properties, such as fillers, ultraviolet light (UV) or thermal stabilizers, antioxidants, free-radical scavengers, leveling agents, anti-popping agents, and pigments.

DETAILED DESCRIPTION OF THE INVENTION

The method of the present invention is a slush-molding process having steps of dosing a powder to a mold heated to a given temperature thus obtaining layer of partially or completely melted powder on the mold, removing any excess power, heating mold to complete melting, cooling mold with suitable cooling means to form a film, and stripping film from mold, said method characterized by:
  a) employing, as the powder to be slush molded, the composition of the present invention,
  b) heating mold to complete melting to a sufficiently high temperature for a sufficient time to cause cross-linking in-situ as the melting is completed.

The mold is preferably heated to a temperature of about 180–270° C., more preferably about 200–250° C. The heating cycle (time that the mold is held at this elevated temperature to form homogeneous skin) is preferably about 2–6 minutes. Under these conditions, the powder of the composition of this invention melts, levels out, and cross-links in-situ to form a homogeneous skin. Following the heating cycle, the mold and homogeneous skin are cooled and the resulting film or sheet is removed from the mold.

The slush molding process of the present invention yields a resulting film or sheet that is useful as a free-standing material or as part of a laminated structure. The sheet may be embossed with a grain pattern. Such embossed sheet has excellent grain retention and thus has particular use in simulated leather applications and in instrument panel skins and door skins for automobiles. Optionally, the sheet can be filled with inorganic fillers. Useful fillers include flame-retardant fillers such as calcium carbonate or non flame retardant fillers such as mica, talc and glass.

Automotive uses include skins for instrument panels and for other locations such as door panels and other simulated leather coverings. Thickness of the sheet can range from 0.1 to 2 mm.

Composition of Present Invention used in Slush Molding Process

The composition of the present invention comprises a melt-blend of an acid copolymer, a cross-linking copolymer, and preferably a crosslinking promoter made under conditions to ensure that the composition does not significantly react/crosslink in the blending process (prior to its use in slush molding). Preferably, the composition is made at a temperature range that is maintained at about 60° to 150° C.; preferably, between 90° to 120° C. The time at elevated temperature is another variable that is preferably controlled. Preferred time depends on the crosslinker. For the preferred crosslinkers, the time at temperature range is between 10 seconds to 1 hour; preferably, between 1 minute to 30 minutes.

These thermoplastic alloy compositions are generally prepared by melt blending the polymeric components under high shear conditions, for example, in an extruder. The various ingredients may first be combined with one another e.g., in a pellet blend, or they may be combined with one another via simultaneous or separate metering of the various components. They may also be and blended in one or more passes into separate sections of the mixing equipment.

The compositions made by this method comprise:
  a) 5–95% by weight of an acid copolymer comprising at least 50% by weight of ethylene, 1–35% by weight of an (acid containing) unsaturated carboxylic acid, and 0–49% by weight of a moiety selected from at least one of alkyl acrylate, alkyl methacrylate, vinyl ether, alkylene, carbon monoxide and sulphur dioxide, and further wherein the acid groups are optionally partially neutralized with metal ions; and
  b) 95–5% by weight of a cross-linking copolymer comprising at least 50% by weight of ethylene, 0.5–25% by weight of at least one reactive moiety selected from the group consisting of
    (i) an unsaturated epoxide of 4–11 carbon atoms,
    (ii) an unsaturated isocyanate of 2–11 carbon atoms,
    (iii) an alkoxy or alkyl silane wherein the alkyl group is from 1–12 carbon atoms,
    (iv) an alkyl halide, and
    (v) oxazoline, and 0–49% by weight of a moiety selected from at least one of an alkyl acrylate, alkyl methacrylate, vinylether, alkylene, carbon monoxide and sulphur dioxide, where the alkyl and ether groups are of 1–12 carbon atoms; and preferably
  c) a cross-linking promoter; and more preferably in addition to the cross-linking promoter,
  d) a release agent.

Preferably, a composition according to the present invention comprises
  (a) 10–90% by weight of an acid co- or terpolymer of ethylene and 5–25% by weight of a carboxylic acid and an alkylacrylate which is optionally partially neutralized with metal ions;
- (b) 90–10% by weight of a cross-linking co- or terpolymer of ethylene and 1–15% by weight of glycidylmethacrylate and optionally an alkylacrylate; and
- (c) a cross-linking promoter.

In a further preferred embodiment, according to the present invention, the composition comprises:
- (a) 30–70% by weight of an acid co- or terpolymer of ethylene and 5–20% by weight of acrylic- or methacrylic acid and an alkylacrylate which is optionally partially neutralized with metal ions;
- (b) 70–30%, by weight of a cross-linking co- or terpolymer of ethylene and 1–15% by weight of glycidylmethacrylate and optionally 1–10% by weight of butylacrylate; and
- (c) a cross-linking promoter.

In one preferred embodiment according to the present invention the composition comprises
- (a) about 10 to about 90 wt. %, more preferably about 30 to about 60 wt. %, acid copolymer of ethylene and an alpha, beta-unsaturated $C_3$–$C_8$ carboxylic acid, that can be optionally neutralized at least partially with Metal ions selected from group Ia, Ib, IIa, IIIa, IVa, VIb and VIII of the periodic table, and optionally one or more softening comonomers copolymerizable with ethylene;
- (b) 90–10 wt. % of a cross-linking copolymer of ethylene and glycidyl acrylate or glycidyl methacrylate, and optionally a termonomer selected from an alpha olefin or an acrylate; and
- (c) a cross-linking promoter such as tertiary amines or alkyl halides.

Optionally, any of the above compositions preferably contain in addition to components a), b), and c), release agents that assist in preventing the composition from sticking to metal surfaces. Optionally, any of the above compositions can also contain pigments, UV stabilizers, and other additives typically used in slush molding compositions.

The slush molding powder of the present invention is made from the resultant compositions of the present invention preferably by grinding, preferably cryogenically, the composition to a particle size of between 50 and 500 micrometers. Alternatively, the composition can be processed by means of an aqueous dispersion process as described in U.S. Pat. No. 5,928,577.

The components employed in the composition of the present invention can be described in more detail as follows:

a) Acid Copolymer

Preferably, the acid copolymer (a) is selected from one or more α-olefins of the formula R—CH=$CH_2$, wherein R is a radical of hydrogen or an alkyl radical having from 1 to 8 carbon atoms, copolymerized with one or more α,β-ethylenically unsaturated carboxylic acids having from 3 to 8 carbon atoms, said copolymer being a direct copolymer of the α-olefins and the unsaturated carboxylic acid in which the carboxylic acid groups are randomly distributed over all molecules and in which the α-olefin content of the copolymer is at least 50 mol percent, based on the α-olefin-acid copolymer. The unsaturated carboxylic acid content of the copolymer is preferably from 0.2 to 25 mol %, based on the α-olefin-acid copolymer, and any other monomer component optionally copolymerized in said copolymer.

Suitable α-olefins include ethylene, propylene, butene-1, pentene-1, hexene-1, heptene-1, 3-methylbutene-1, and 4-methylpentene-1 and the like. Ethylene is the preferred α-olefin. The concentration of the α-olefin in the copolymer is preferably greater than 80 mol percent. Examples of α,β-ethylenically unsaturated carboxylic acids are acrylic acid, methacrylic acid, ethacrylic acid, itaconic acid, maleic acid, fumaric acid, monoesters of said dicarboxylic acids, such as methyl hydrogen maleate, methyl hydrogen fumarate, ethyl hydrogen fumarate and maleic anhydride. Although maleic anhydride is not a carboxylic acid in that it has no hydrogen attached to the carboxyl groups, it can be considered an acid for the purposes of the present invention because its chemical reactivity is that of an acid. Similarly, other α,β-monoethylenically unsaturated anhydrides of carboxylic acids can be employed. The preferred unsaturated carboxylic acids are methacrylic and acrylic acids. The concentration of acidic monomer in the copolymer is preferably from 1 to 10 mol percent.

More than one α-olefin can be employed to provide the hydrocarbon nature of the copolymer base. The scope of base copolymers suitable for use in the present invention is illustrated by the following two component examples: ethylene/acrylic acid copolymers, ethylene/methacrylic acid copolymers, ethylene/itaconic acid copolymers, ethylene/methyl hydrogen maleate copolymers, and ethylene/maleic acid copolymers, etc. Examples of tricomponent copolymers include: ethylene/acrylic acid/methyl methacrylate copolymers, ethylene/methacrylic acid/ethyl acrylate copolymers, ethylene/itaconic acid/methyl methacrylate copolymers, ethylene/methyl hydrogen maleate/ethyl acrylate copolymers, ethylene, methacrylic acid/vinyl acetate copolymers, ethylene/acrylic acid/vinyl alcohol copolymers, ethylene/propylene/acrylic acid copolymers, ethylene/styrene/acrylic acid copolymers, ethylene/methacrylic acid/acrylonitrile copolymers, ethylene/fumaric acid/vinyl methyl ether copolymers, ethylene/vinyl chloride/acrylic acid copolymers, ethylene/vinylidene chloride/acrylic acid copolymers, ethylene/vinyl fluoride/methacrylic acid copolymers, and ethylene/chlorotrifluoroethylene/methacrylic acid copolymers.

In addition to the third monomer component of the copolymer stated above, additional third monomeric components can be an alkyl ester of an α,β-ethylenically unsaturated carboxylic acid of 3 to 8 carbon atoms where the alkyl radical has 4 to 18 carbon atoms. Particularly preferred are the terpolymers obtained from the copolymerization of ethylene, methacrylic acid, and alkyl esters of methacrylic acid or acrylic acid with butanol. The concentration of this optional component is 0.2 to 25 mol percent, based on the weight of copolymer, preferably from 1 to 10 mol percent. Representative examples of the third component include n-butyl acrylate, isobutyl acrylate, secondary butyl acrylate, tertiary butyl acrylate, n-butyl methacrylate, isobutyl methacrylate, sec-butyl methacrylate, t-butyl methacrylate, n-pentyl acrylate, n-pentyl methacrylate, isopentyl acrylate, isopentyl methacrylate, n-hexyl acrylate, n-hexyl methacrylate, 2-ethyl-hexyl acrylate, 2-ethyl-hexyl methacrylate, stearyl acrylate, stearyl methacrylate, n-butyl ethacrylate, 2-ethyl-hexyl ethacrylate. Also, the third component includes mono- and di-esters of 4 to 8 carbon atom dicarboxylic acids such as n-butyl hydrogen maleate, sec-butyl hydrogen maleate, iso butyl hydrogen maleate, t-butyl hydrogen maleate, 2-ethyl hexyl hydrogen maleate, stearyl hydrogen maleate, n-butyl hydrogen fumarate, sec-butyl hydrogen fumarate, isobutyl hydrogen fumarate, t-butyl hydrogen fumarate, 2-ethyl hexyl hydrogen fumarate, stearyl hydrogen fumarate, n-butyl fumarate, sec-butyl fumarate, isobutyl fumarate, t-butyl fumarate, 2-ethyl hexyl fumarate, stearyl fumarate, n-butyl maleate, sec-butyl maleate, isobutyl maleate, t-butyl maleate, 2-ethyl hexyl maleate, stearyl maleate. The preferred alkyl esters contain alkyl groups of 4 to 8 carbon atoms. The most preferred contain 4 carbon atoms. Representative examples of the most preferred esters are n-butyl acrylate, isobutyl acrylate, butyl methacrylate, isobutyl methacrylate, tertiary butyl acrylate, tertiary butyl methacrylate.

The copolymers after polymerization but prior to ionic crosslinking (if desired) can be further modified by various reactions to result in polymer modification, which do not interfere with crosslinking. Halogenation of an olefin acid copolymer is an example of such polymer modification. The preferred base copolymers are those obtained by the direct copolymerization of ethylene with a monocarboxylic acid comonomer. The melt index of the polymer generally ranges from 0.1 g/10 minutes to 3000 g/10 minutes, preferably 10 to 2000 g/10 minutes.

The copolymer can optionally be neutralized with 10 to 70% neutralized with metal ions selected from groups Ia, Ib, IIa, IIIa, IVa, VIb, and VIII of the Periodic Table of Elements such as sodium, potassium, zinc, calcium, magnesium, lithium, aluminum, nickel, and chromium. Preferably the copolymer has from about 35 to about 70% of the carboxylic acid groups ionized by neutralization with metal ions selected from the group consisting of sodium, potassium, zinc, calcium, and magnesium.

Crosslinking Copolymer b)

Typical crosslinking copolymers are employed in the stoichiometric range of about 1:0.05 to 1:1.5 with respect to the acid group in the base resin (acid copolymer). Preferably, the range is between 1:0.1 to 1:1. The range of acid in the base resin before crosslinking is suitably between about 1 and 30 percent by weight of the ethylene. Preferably, the range is between 4 to 20 percent. The hydroxy functionality in the base resin before crosslinking is suitably between about 0 to 30 percent by weight of the ethylene. Preferably, the range is between 2 to 10 percent.

Preferably, the crosslinking copolymer component of the ETP-TPO is an ethylene/glycidyl acrylate or ethylene/glycidyl methacrylate copolymer.

Optionally, and preferably but not exclusively, the ethylene/glycidyl acrylate or ethylene/glycidyl methacrylate copolymer contains copolymerized units of an alkyl acrylate or an alkyl methacrylate having 1–6 carbon atoms and an alpha olefin with 1–8 carbon atoms. The ethylene/glycidyl acrylate or ethylene/glycidyl methacrylate copolymer contains 60–88 weight percent ethylene and 1–12 weight percent glycidyl acrylate or glycidyl methacrylate. Representative alkyl acrylates and alkyl methacrylates that are used in the copolymer include methyl acrylate, ethyl acrylate, propyl acrylate, n-butyl acrylate, isobutyl acrylate, hexyl acrylate, methyl methacrylate, ethyl methacrylate, propyl methacrylate, butyl methacrylate, and hexyl methacrylate. Ethyl acrylate is preferred and n-butyl acrylate is especially preferred. The alpha olefin can be selected from the group of propylene, octene, butene and hexene, propylene is preferred.

The ethylene/glycidyl (meth)acrylate, preferably containing an alkyl acrylate of 1–6 carbon atoms and an alpha olefin with 1–8 carbon atoms, can be prepared by direct polymerization, for example, copolymerizing ethylene, an alkyl acrylate, and glycidyl methacrylate or glycidyl acrylate in the presence of a free-radical polymerization initiator at elevated temperatures, generally 100–270° C., usually 130–230° C., and at elevated pressures, i.e. 140–350 MPa. The most preferred ethylene/glycidyl(meth)acrylate copolymers that are used in this invention are copolymers of ethylene, ethyl acrylate, glycidyl methacrylate, and, especially, ethylene, n-butyl acrylate, and glycidyl methacrylate.

The copolymer should have a Melt Flow Index (190° C./2.16 kg) of 10–2000.

Crosslinking Promoter c)

Preferably, the composition of this invention includes a sufficient amount of cross-linking promoter such as tertiary amines or alkyl halides, or partially neutralized phosphate esters. Particularly preferred is a promoter sold by Vanderbuilt under the tradename of Vanfree® VAM. One skilled in the art will be able to determine the amount of promoter that is sufficient. Preferably, the level of promoter is high enough to permit commercially reasonable cross-linking speed at elevated temperature while low enough to allow for reasonably long storage shelf life for the blended composition. Preferably, the promoter should be present, but in an amount of less than about 1 wt. %, more preferably in an amount of from about 0.1 to about 0.6 wt. %, and most preferably in an amount of from about 0.2 to about 0.5 wt. % based on the weight of components a) and b).

Release Agent d)

The composition of this invention can optionally include, in addition to the promoter, a sufficient amount of at least one release agent to reduce adhesion to metal molds. Preferably, the release agent, if present, should be included in a total amount of about 1 to about 12 wt. % based on the weight of components (a) and (b). More preferably the release agent, if included, should be present in an amount of from about 1.0 to about 10 wt. %, and most preferably in an amount of from about 2.0 to about 5.0 wt. %, depending upon the specific release agent used. Examples for such release agents have been found to be polyoxyethylene sorbitan monopalmitate (HLB15.6) as supplied by KAO chemicals or crosslinked silicone gum as supplied by Dow-Corning under MB50-002 or Toray-Dow Corning under the trade name BY27-002.

In one embodiment, the present invention does not include an internal release agent in addition to the promoter. In the case where an internal release agent is not included, an external release agent can be utilized. Preferable external release agents can be commercial Teflon® coating materials; or silicone or siloxane coatings such as those sold by DuPont under the trade name Trasys® 825.

In a particularly surprising embodiment, neither an additional internal release agent nor an external release agent is required when partially neutralized phosphate ester is included as a cross-linking promoter. Sufficient promoter should be included so that there is sufficient phosphate ester to provide both functions.

Other Additives

The compositions may further comprise any additive which could be useful to enhance or modify properties, such as fillers, ultraviolet light (UV) or thermal stabilizers, antioxidants, free-radical scavengers, leveling agents, antipopping agents, and pigments.

With respect to the additives that can be incorporated into the composition, the following guidelines are offered, and will be readily appreciated by one skilled in the art. Antioxidants such as cinnamate or phosphite-based anti-oxidants can be employed, generally at levels of between 0 to 5% by weight. Standard ultraviolet light absorbers and free-radical scavengers can be employed at levels of between 0 to 3%, leveling agents at 0 to 2%, and anti-popping agents at 0 to 5%.

Specifically with respect to pigment, the composition can contain up to 50% by weight of pigment based on weight of the film-forming components of the coating composition. Any organic and inorganic pigments can be used including phthalocyanine blue; carbon black; metal oxides such as titanium dioxide, zinc oxide, and iron oxide; metallic powders; metal hydroxides and mica flakes.

Other Aspects of Invention

The invention further relates to the slush molding powder prepared from a composition as described herein. In addition, the invention relates to molded articles produced by the slush molding process of the present invention.

EXAMPLES

All parts in the following examples are based on weight.

In order to prepare the samples, the components as described above are dry blended together with stabilizers and additives and subsequently extruded on a 24 mm twin screw extruder with an established temperature profile which leads a melt temperature of less than 100° C. at the exit of the die. This is necessary in order to be able to prevent premature crosslinking of the resin before compounding. Also, at more elevated temperatures difficulties would be encountered during strand cutting of the extruder used.

The selection of additive master batches has to take account the aforementioned temperature limitations. Therefore, low molecular weight waxes with a melting temperature of less than 100° C. and a high enough Melt Flow Index (MFI) are preferably used in this process. In particular color master batches obtained sold by BASF under the tradename Epulene and Sicoversal are suitable for the described invention.

After compounding, the resins are ground in a cryogenic grinder in order to obtain a particle size of approximately 300 micrometers and added into a mold heated to temperatures between 200 and 240° C. After about 3–4 minutes the mold is cooled down to temperatures between 30 and 60° C. and the molded sheet is removed from the mold for further testing.

Tests

The following tests are undertaken:

Flow: MFI (according to ASTM D1238)

Surface appearance

Crosslink density is measured by the amount by weight of polymer insoluble in toluene at room temperature (High=80–100%; Medium=20–40%).

Temperature resistance is judged by the amount of permanent set in the compression set test at 120° C. according to DIN 53517

EXAMPLES

Example 1: 38 wt. % comp 1-1 and 62 wt. % comp 2-2

Example 2 31.6 wt. % comp 1-1 and 68.4 comp 2-2

Example 3 45 wt. % comp 1-1 and 55 wt. % comp 2-2

Comparative Example 20 wt. % comp 3 44 wt. % comp 4 2 wt. % comp 2-1 34 wt. % comp 1-3

Components

Component 1-1

A copolymer of ethylene and 12 wt. % methacrylic acid having a Melt Flow Index (MFI) of 1000 at 190° C./2.16 kg according to ASTM D1238

Component 1-2

A copolymer of ethylene and 12 wt. % methacrylic acid having a melt flow index of 100 at 190° C./2.16 kg Component 1-3

A copolymer of ethylene and 12 wt. % methacrylic acid having a melt flow index of 7 at 190° C./2.16 kg Component 2-1

A copolymer of ethylene and 1.6 wt. % glycidyl methacrylate having a MFI of 25 at 190° C./2.16 kg Component 2-2

A copolymer of ethylene and 10 wt % glycidyl methacrylate having a MFI of 1000 at 190° C./2.16 kg Component 2-3

A terpolymer of ethylene, 4 wt. % n-butylacrylate and 10 wt. % glycidylmethacrylate with a MFI of 600 at 190° C./2.16 kg Component 3

A polypropylene homopolymer with a MFI of 8 at 230° C./2.16 kg (Moplen C30S) obtained from Montell Component 4

Nordel® 3681 (Commercial Ethylene Propylene 1-4 Hexadiene terpolymer) obtained from DuPont Dow

| Example No. | MFI | Surface Appearance | Crosslink Density | Temperature Resistance |
|---|---|---|---|---|
| 1 | 900 | Smooth | High | Good |
| 2 | 900 | Smooth | High | Good |
| 3 | 900 | Smooth | High | Good |
| Comparative | 0.1 | Rough-not leveled | Medium | Poor (creeps) |

Examples 1, 2 and 3 result in a well-leveled continuous polymer film when subject to the aforesaid thermal treatment whereas the Comparative Example represents a powder with poor flow properties which does not result in a leveled film when heated due to the low MFI.

What is claimed is:

1. A method of slush molding having steps of dosing a powder to a mold heated to a given temperature thus obtaining layer of partially or completely melted powder on the mold, heating the mold to complete melting, cooling the mold with suitable cooling means to form a film, and stripping the film from the mold, said method characterized by:

a) said powder dosed to the mold comprising
      i) 5–95% by weight of an acid copolymer comprising at least 50% by weight of ethylene, 1–35% by weight of an unsaturated carboxylic acid, and 0–49% by weight of a moiety selected from at least one of alkyl acrylate, alkyl methacrylate, vinylether, alkylene, carbon monoxide and sulphur dioxide;
      ii) 95–5% by weight of a cross-linking copolymer comprising at least 50% by weight of ethylene, 0.5–25% by weight of at least one reactive moiety selected from the group consisting of
         (i) an unsaturated epoxide of 4–11 carbon atoms,
         (ii) an unsaturated isocyanate of 2–11 carbon atoms,
         (iii) an alkoxy or alkyl silane wherein the alkyl group is from 1–12 carbon atoms,
         (iv) an alkyl halide, and
         (v) oxazoline, and 0–49% by weight of a moiety selected from at least one of an alkyl acrylate, alkyl methacrylate, vinylether, alkylene, carbon monoxide and sulphur dioxide, where the alkyl and ether groups are of 1–12 carbon atoms; and
      iii) a cross-linking promoter; wherein said powder is made by blending the components for a time at a temperature below that at which substantial cross-linking occurs; and
   b) the mold is heated to complete melting at a sufficient temperature and is held for sufficient time to cross-link the melted film in-situ.

2. The method according to claim 1, wherein the acid copolymer component i) of the powder dosed to the mold is partially neutralized with metal ions.

3. The method according to claim 1, wherein the powder dosed to the mold comprises:
   a) 10–90% by weight of an acid co- or terpolymer of ethylene and 5–25% by weight of the unsaturated carboxylic acid and, optionally, the alkylacrylate.
   b) 90–10% by weight of a cross-linking co- or terpolymer of ethylene and 1–15% by weight of glycidylacrylate or methacrylate; and
   c) less than about 1.0 wt. % of the cross-linking promoter based on the weight of components (a) and (b).

4. The method according to claim 3, wherein the acid co- or terpolymer of the powder dosed to the mold is partially neutralized with metal ions.

5. The method according to claim 3 or 4, wherein the cross-linking co- or terpolymer is one of ethylene, glycidylacrylate or methacrylate and an alkylacrylate.

6. The method of claim 3 wherein the powder dosed to the mold comprises:
   a) 30–70% by weight of a acid co- or terpolymer of ethylene and 5–20% by weight of acrylic or methacrylic acid and an alkylacrylate,
   b) 70–30%, by weight of a cross-linking co- or terpolymer of ethylene and 1–15% by weight of glycidylmethacrylate, and
   c) about 0.1 to about 0.6 wt. % of a partially neutralized phosphate ester cross-linking promoter based on the weight of components (a) and (b).

7. The method according to claim 6, wherein the acid co- or terpolymer of the powder dosed to the mold is partially neutralized with metal ions.

8. The method according to claim 3 or 4, wherein the cross-linking co- or terpolymer is one of ethylene, 1–15 wt. % glycidylacrylate or methacrylate and 1–10% by weight of butylacrylate.

9. The method according to claims 1, 3 or 6 wherein the powder dosed to the mold further contains a sufficient amount of a release agent.

10. The method according to claim 9 wherein the release agent is present in an amount of from about 1 to about 12 wt. % based on the weight of the acid copolymer and the cross-linking copolymer.

* * * * *